United States Patent [19]

Beim et al.

[11] Patent Number: 5,267,916
[45] Date of Patent: Dec. 7, 1993

[54] MULTIPLE SPEED AUTOMATIC TRANSMISSION FOR AUTOMOTIVE VEHICLES

[75] Inventors: Rudolf Beim, Southfield; George E. Lemieux; Richard D. Moan, both of Livonia, Mich.

[73] Assignee: Ford Motor Company, Dearborn, Mich.

[21] Appl. No.: 985,721

[22] Filed: Dec. 4, 1992

[51] Int. Cl.⁵ .............................................. F16H 3/56
[52] U.S. Cl. .................................................... 475/285
[58] Field of Search ................ 475/200, 206, 219, 285

[56] References Cited

U.S. PATENT DOCUMENTS

| | | | |
|---|---|---|---|
| 2,886,809 | 6/1975 | Kiss | 475/17 |
| 3,094,013 | 6/1963 | Ferguson | 475/284 X |
| 3,265,175 | 8/1966 | Crosswhite | 192/87.13 |
| 3,482,469 | 12/1969 | Mori | 475/285 X |
| 3,659,479 | 5/1972 | Kiss | 475/218 |
| 4,404,869 | 9/1983 | Numazawa et al. | 475/207 |
| 4,416,168 | 11/1983 | Arai et al. | 475/142 |
| 4,572,026 | 2/1986 | Weiss | 180/244 |
| 4,624,154 | 11/1986 | Kraft et al. | 475/285 X |
| 5,039,305 | 8/1991 | Pierce | 475/200 X |
| 5,106,352 | 4/1992 | Lepelletier | 475/280 |
| 5,129,870 | 7/1992 | Pierce | 475/285 |

FOREIGN PATENT DOCUMENTS

| | | | |
|---|---|---|---|
| 58-163849 | 7/1983 | Japan. | |
| 1402442 | 4/1972 | U.S.S.R. | |
| 1044480 | 2/1981 | U.S.S.R. | |
| 1020266 | 5/1983 | U.S.S.R. | 475/219 |

Primary Examiner—Dirk Wright
Attorney, Agent, or Firm—Frank G. McKenzie; Roger L. May

[57] ABSTRACT

An automatic transmission for an automotive vehicle includes first and second simple planetary gear units, certain of whose elements are continually interconnected and certain others are releasably connected through operation of friction elements and one-way couplings. The input shaft of the transmission is adapted to drive elements of the planetary gear units through an underdrive gearset and an overdrive gearset. The various speed ratios result by either underdriving or overdriving an element of the planetary gear unit or both underdriving one element and overdriving another element. Several parallel torque delivery paths include a series arrangement of the overrunning coupling in parallel with a friction element. This arrangement permits engine braking during coast conditions when the coupling overruns. The overdrive gearset is available to produce a speed ratio without involving the planetary gear units.

14 Claims, 4 Drawing Sheets

| GEAR | CLUTCH ELEMENTS ||||| OWC1 DRIVE | 84 COAST |
|---|---|---|---|---|---|---|---|
| | 82 B1 | 72 CL1 | 76 CL2 | 32 CL3 | 74 CL4 | | |
| 1M | C | X | | | | X | N/A |
| 1 | | X | | | | X | O/R |
| 2 | | X | X | | | O/R | O/R |
| 3 | | X | | X | | O/R | O/R |
| 4 | | | X | X | | O/R | O/R |
| 5 | | | | X | X | O/R | O/R |
| R | X | | | | X | N/A | X |

FIG 3
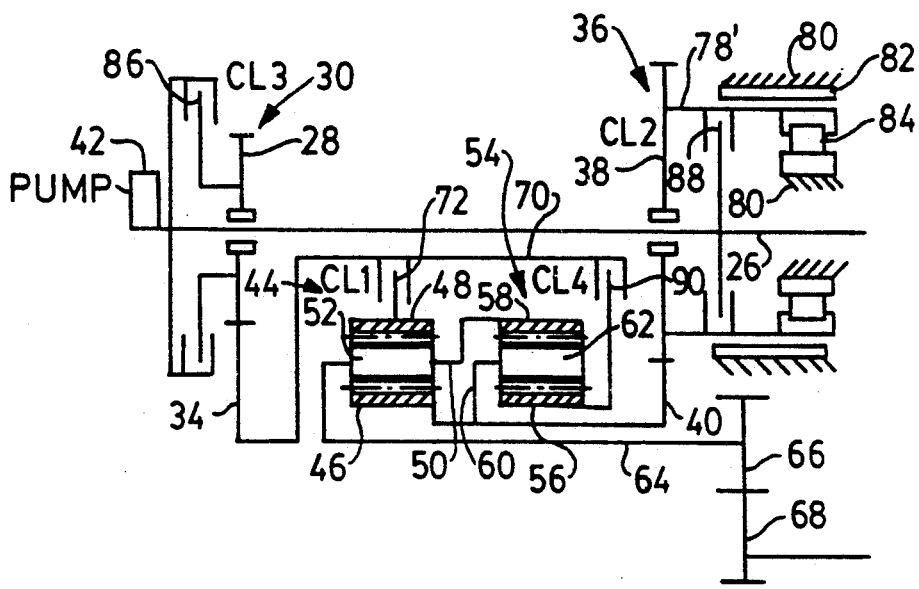
FIG 4
| GEAR | CLUTCH ELEMENTS | | | | | OWC1 | 84 |
|---|---|---|---|---|---|---|---|
| | 82 B1 | 72 CL1 | 76 CL2 | 32 CL3 | 74 CL4 | DRIVE | COAST |
| 1M | C | X | | X | | X | N/A |
| 1 | | X | | X | | X | O/R |
| 2 | | X | | X | X | O/R | O/R |
| 3 | | X | X | X | | O/R | O/R |
| 4 | | X | X | | X | O/R | O/R |
| 5 | | | X | X | X | O/R | O/R |
| R | X | | | X | X | N/A | X |
FIG 5
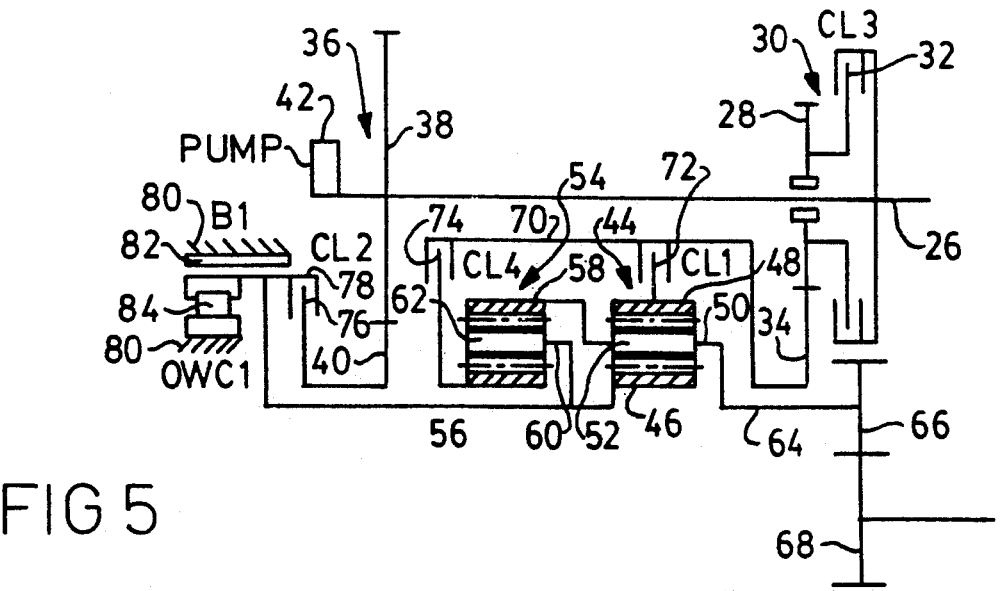

| GEAR | CLUTCH ELEMENTS | | | | | | OWC1 84 | |
|---|---|---|---|---|---|---|---|---|
| | 82 B1 | 72 CL1 | 88 CL2 | 86 CL3 | 90 CL4 | 92 CL5 | DRIVE | COAST |
| 1M | C | X | | X | | | X | N/A |
| 1 | | X | | X | | | X | O/R |
| 2 | | X | | X | X | | O/R | O/R |
| 3 | | X | X | X | | | O/R | O/R |
| 4 | | X | X | | X | | O/R | O/R |
| 5 | | | X | X | X | | O/R | O/R |
| 6 | | | X | | X | X | O/R | O/R |
| R | X | | | X | X | | N/A | X |

MULTIPLE SPEED AUTOMATIC TRANSMISSION FOR AUTOMOTIVE VEHICLES

BACKGROUND OF THE INVENTION

1. Field of the Invention

The present invention relates to the clutch, brake and gear arrangement of an automatic transmission for motor vehicles, particularly to such arrangements that combine planetary gear units and layshaft gearsets.

2. Description of the prior art

Four-speed automatic transmissions conventionally include multiple planetary gearsets; five or six friction elements, such as hydraulically actuated clutches and brakes; a torque converter; and damped torque converter lock-up clutch. These transmissions are employed in rear-wheel drive vehicles wherein the transmission shafts engine crankshaft are parallel to the longitudinal axis of the vehicle, and front-wheel drive vehicles wherein the transaxle and engine crankshaft are parallel to the transverse axis of the vehicle.

A current trend in the automotive industry is to provide five-speed and six-speed automatic transmissions, which conventionally require three planetary gear units and even a larger number of friction elements to control the gearing than are required in four-speed transmissions. Automatic transmissions having five or six forward speed ratios require greater size, particularly increased length, to accommodate additional planetary gear unit and friction elements Furthermore, automatic transmissions require nonsynchronous gearshifting, which conventionally require still greater use of oneway couplings and more space within the transmission casing, particularly increased length.

These trends toward features that enhance performance of automatic transmissions have produced need for an extremely compact transmission suitable for use in a front-wheel drive vehicle and able to fit in a space that is greatly reduced in comparison to the space required for conventional five-speed or six-speed automatic transmissions. Front-wheel drive vehicles present particularly acute problems because of the inherent space limitation associated with packaging the transmission and engine with their axes directed transversely between the drive wheels of the vehicle.

U.S. Pat. No. 5,106,352 describes a multiple speed automatic transmission having two gearsets comprising constant mesh gear wheels, a double planetary gearset, and first and second control brakes. The transmission is able to provide six forward speeds, brake neutral and reverse drive.

SUMMARY OF THE INVENTION

It is an object of this invention to provide a multiple speed automatic transmission in a highly compact form requiring a minimal number of friction element to control operation of the components of the gear units and gearsets that produce the various speed ratios. The transmission is suitable for use in nonsynchronous and synchronous modes of operation. One version of the transmission provides nonsynchronous sequential upshifts and downshifts and nonsynchronous jump shifts, in which a gear ratio change is made between nonsequential gear ratios.

A transmission according to this invention includes a combination of planetary gear units and conventional layshaft gearsets, the gear units and gearsets being arranged such that elements of the gear units are driven from the input shaft through the layshaft gearsets at two different speeds ratios.

An advantage of the gear arrangement according to this invention is its compact size, particularly the reduction in overall length of the transmission and the gear box required to contain the transmission. An additional advantage is the low number of hydraulically actuated friction elements required to control the transmission gear elements.

In realizing these advantages and objectives a transmission according to the present invention includes an underdrive gearset and an overdrive gearset driveably connected to an input shaft and elements of first and second planetary gear units. Each planetary gear unit includes a sun gear, ring gear, pinions meshing with the sun gear and ring gear, and carrier rotatably supporting the pinions. The sun gear of the first gear unit, carrier of the second gear unit and one of the gearsets are mutually driveably connected. The carrier of the first gear unit, ring gear of the second gear unit and output shaft are mutually driveably connected. The control elements of the transmission hold the sun gear of the first gear unit and components connected to that sun gear against rotation on the transmission casing. A first friction clutch releasably connects the input shaft to one of the gearsets; a second friction clutch releasably connects the input shaft to the other of the gearsets. Two additional friction clutches releasably connect the ring gear of the first gear unit to one of the gearsets and the sun gear of the second gear unit to one of the gearsets.

A six-speed version of the transmission includes a second friction brake adapted to hold one of the gearsets against rotation on the transmission casing A transmission according to the invention that produces five forward speed ratios, reverse drive and first speed ratio in a manually selected range requires only four hydraulically actuated friction clutches, a friction brake band and overrunning coupling. Six forward speed ratios, reverse drive and first speed ratio in a manually selected range are produced in a transmission according to this invention through operation of only four hydraulically actuated friction clutches, two friction brakes and one overrunning coupling.

BRIEF DESCRIPTION OF THE DRAWINGS

FIG. 3 is a schematic diagram of gearing, couplings, brakes and clutches for a transmission.

FIG. 4 is a schedule showing the engaged and disengaged state of the clutches, brake and coupling of FIG. 3.

FIG. 5 is a schematic diagram of a variation of the transmission FIG. 3.

DESCRIPTION OF THE PREFERRED EMBODIMENT

Figures 1, 2:
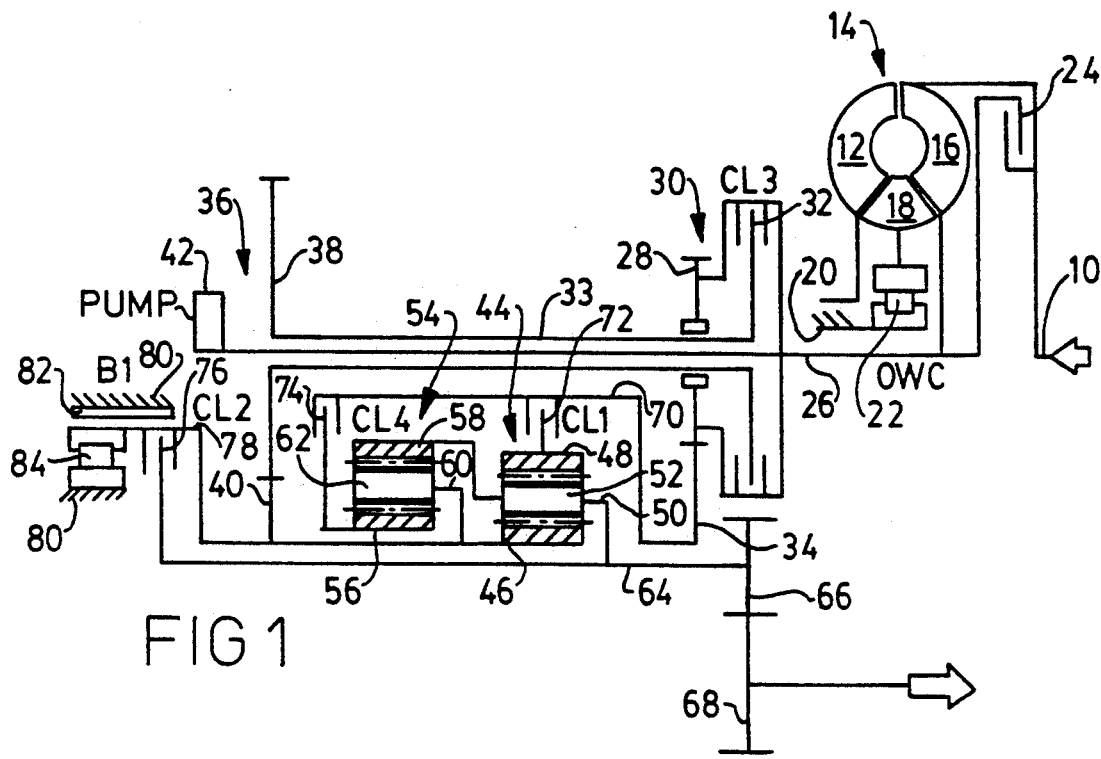
FIG. 1 is a schematic diagram showing an arrangement of gearing, couplings, clutches and brakes for a transmission according to the invention.
FIG. 2 is a schedule showing the engaged and disengaged state of the clutches, brake and coupling of FIG. 1 corresponding to the various gear ratios produced by the transmission.

Referring first to FIG. 1, an engine crankshaft 10 is driveably connected to a bladed impeller 12 of a hydrokinetic torque converter 14, which further includes a bladed turbine 16 and bladed stator 18. The impeller, turbine, and stator define a toroidal flow path, in which hydraulic fluid circulates, thereby producing a hydrokinetic drive connection between the impeller and turbine. The stator is mounted on a stator, shaft 20 through an overrunning coupling 22, which produces one-way drive connection between the stator rotor and shaft 20. A torque converter bypass clutch 24, an hydraulically-actuated friction element, is engaged to directly driveably connect crankshaft 10 to a transmission input shaft 26 and is released so that the crankshaft drives the input shaft through the hydrokinetic connection produced by torque converter 14.

Input shaft 26 is releasably connected to a first pinion 38 of a first gearset 36 by an hydraulically actuated friction clutch 32, which is pressurized and vented in accordance with the schedule of FIG. 2. Pinion 38, which is supported rotatably on the shaft 26, is in continual meshing engagement with gear 40 of the first gearset.

A second gearset 30 includes a pinion 28 fixed to input shaft 26, and a gear 34, which is in continual meshing engagement with pinion 28.

Shaft 26 drives an hydraulic pump 42, which is supplied with hydraulic fluid from a sump. The pump outlet side is connected to an hydraulic control and actuation circuit, through which the torque converter 14 is continually supplied with a source of pressurized hydraulic fluid. Bypass clutch 24, one of a number of hydraulically-actuated friction elements, i.e., clutches and brakes, is engaged by pressurizing fluid lines leading to the bypass clutch and venting those lines to release the bypass clutch.

A first simple planetary gear unit 44 includes sun gear 46, ring gear 48, carrier 50, and a set of planetary pinions 52, rotatably supported on carrier 50 and in continuous meshing engagement with ring gear 48 and sun gear 46.

A second simple planetary gear unit 54 includes sun gear 56, ring gear 58, carrier 60 and a set of planetary pinions 62, supported rotatably on carrier 60 and in continuous meshing engagement with sun gear 56 and ring gear 58.

Sun gear 46 and carrier 60 are driveably connected mutually to gear 40. Ring gear 58, carrier 50 and output shaft 64 are mutually driveably connected.

The final drive gearing includes output pinion 66 and output gear 68, which is in continual meshing engagement with pinion 66 and drives the spindle of a differential located between axleshafts (not shown) that transmit power to the drive wheels of the vehicle.

Gear 34 is driveably connected to a drum 70, which is releasably connected by clutch 72 to ring gear 48, and by clutch 74 to sun gear 56.

Shaft 64 is releasably connected by clutch 76 to a brake drum 78, sun gear 46, carrier 60, and gear 40. The brake drum 78 is held against rotation on the transmission casing 80 by a brake band 82; which frictionally engages drum 78 when an hydraulic servo that controls actuation of the brake band is Pressurized, and releases drum 78 when the servo is vented. The inner race of a coupling 84 is driveably connected to brake drum 78; the outer race of coupling 84 is fixed to the transmission casing 80 against rotation. Coupling 84 produces a one-way drive connection between casing 80 and the components connected to drum 78.

The vehicle operator changes the position of a gear selector lever by moving it among various ranges, including a manual (1M) range, drive (D or OD) range and a reverse (R) range. Operation of the transmission in each of the gear ratios is described next with reference to the schedule of FIG. 2.

When the 1M range is selected, brake 82 is engaged, thereby holding brake drum 78 and sun gear 46 against rotation on the transmission casing due to frictional engagement of brake band 82 and brake drum 78. Clutch 72 is engaged, the other clutches 32, 74, 76 are disengaged. One-way coupling 84 driveably connects brake drum 78 to the transmission casing during drive conditions and disconnects drum 78 from the transmission casing during coast conditions. The speed ratio is produced in the first planetary gear unit 44 with ring gear 48 driven from shaft 26, the gearset reaction produced by holding sun gear 46 against rotation, and the output taken at carrier 50 and shaft 64. The final drive gearset, which includes pinion 66 and gear 68, drives the axle shafts of the vehicle through a differential mechanism (not shown). During coast condition engine braking is available even though coupling 84 overruns because brake band 82 continually holds sun gear 46 against rotation.

When the vehicle operator moves the gear selector lever to the D or OD range, clutch 72 is engaged, the other frictional elements are disengaged, and one-way coupling 84 drives during drive conditions and overruns during coast conditions. During drive conditions, sun gear 46 is held against rotation by coupling 84, ring gear 48 is driven by shaft 26 through clutch 72, and the output is taken on carrier 50 and shaft 64. During coast conditions in the D range, there is no gearset reaction because coupling 84 overruns and engine braking is unavailable.

A nonsynchronous upshift to the second gear ratio results when clutch 76 is engaged while maintaining clutch 72 engaged. Sun gear 46 is driveably connected through clutch 76 to output shaft 64, which is driveably connected also to carrier 50. In this way, first planetary gear unit 44 is locked-up so that its ring gear, sun gear and carrier all turn at the same speed and in the same direction. Ring gear 48 is driven at a speed reduction from input shaft 26 through gearset 30, which establishes the speed of shaft 64 and pinion 66.

An upshift to the third speed ratio results by disengaging clutch 76, engaging clutch 32 and maintaining clutch 72 engaged. Ring gear 48 is driven at a speed reduction from shaft 26 through gearset 30 and clutch 72. The sun gear of the first planetary gear unit 44 is driven at a speed greater than that of shaft 26 through the speed increase inherent in gearset 36 and the driveable connection produced by engagement of clutch 32. The output of gear unit 44 is taken at carrier 50 and shaft 64. Due to the differential action of gear unit 44, engine braking is provided during coast conditions.

The fourth gear ratio is produced in gear unit 36 due to the engagement of clutches 32 and 76. Clutch 32 driveably connects input shaft 26 to pinion 38, which drives gear 40 and output shaft 64 faster than the speed of shaft 26 due to engagement of clutch 76. The first and second planetary gear units are inactive in the fourth speed ratio. Engine braking is available during coast conditions due to the continuous drive connection between crankshaft 10 and output shaft 64.

To produce the fifth speed ratio, the torque carried by input shaft 26 is split through gearsets 30 and 36 such that carrier 60 of the second planetary gear unit is driven faster than shaft 26, and sun gear 56 is driven slower than shaft 26. The output is taken at ring gear 58, which drives carrier 50 and output shaft 64.

The reverse drive ratio results by engaging brake 82, which holds carrier 60 against rotation from the transmission housing 80, and engaging clutch 74, through which sun gear 56 is driven at a slower speed than that of input shaft 26. The output is taken at ring gear 58, which drives carrier 50 and output shaft 64. Engine braking is available during reverse drive coast conditions.

Referring now to FIG. 3, the components of the transaxle there bear the same identifying numerals as the corresponding components of FIG. 1 except for revisions in the vicinity of the brake band 82' and the minor changes in certain friction elements. For example, clutch 86 is arranged on input shaft 26 so that it releasably connects pinion 28 to input shaft 26, clutch 88 releasably connects brake drum 78' and input shaft 26; clutch 90 releasably connects sun gear 56 of the second Planetary gear unit 54 and drum 70 to produce the first gear ratio.

When the gear selector is moved to the 1M range, brake 82' engages brake drum 78' so that ring gear 46 of the first planetary gear unit is held against rotation. Input shaft 26 drives ring gear 48 through clutch 86, gear unit 30 and clutch 72. The output is taken on carrier 50 and output shaft 64. Engine braking is available in the coast condition even though coupling 84' overruns, because brake 82' is continually applied.

When the gear selector is moved to the D or OD range, the five forward speed ratios listed in FIG. 4 are produced automatically. The first speed ratio is produced automatically by driveably connecting input shaft 26 through clutch 86 and clutch 72 to drive ring gear 48 of planetary gear unit 44. Sun gear 46 is held against rotation on the transmission casing 80 by one-way coupling 84', and the output is taken on carrier 50 and output shaft 64, which drives the final drive pinion 66 and output gear 68.

An automatic nonsynchronous upshift to the second speed ratio results by applying clutch 90 in addition to forward clutch 72 and underdrive clutch 86. With the friction elements so engaged, the speed of input shaft 26 is reduced by driving gearset 30 through clutch 86. Drum 70 transmits input shaft torque through forward clutch 72 to drive ring gear 48 and through intermediate clutch 90 to drive sun gear 56. Due to the driveable connection existing between sun gear 46 and carrier 60, the output is taken at ring gear 58 and carrier 50, which drives output shaft 64. Engine braking is available during coast conditions; output shaft 64 and input shaft 26 are continuous driveable connected through the first and second planetary gear units and gearset 30.

A third gear ratio is produced by maintaining engaged forward clutch 72 and underdrive clutch 86, disengaging intermediate clutch 90, and engaging overdrive clutch 88. This action again drives ring gear 48 at speed reduction from the speed of input shaft 26 through clutch 86 and clutch 72. Sun gear 46 is driven faster than input shaft 26 through operation of gearset 36 and the driveable connection between pinion 38 and input shaft, which results due to the engagement of clutch 88. The output is taken on carrier 50 and output shaft 64.

A fourth gear ratio is produced automatically by driving carrier 60 of the second planetary gear unit at a higher speed than input shaft 26 through operation of gearset 36 and engagement of clutch 88. Clutches 72 and 90 driveably connect the sun gear 56 to ring gear 48 so that the output is taken on carrier 50 and output shaft 64.

To produce the fifth gear ratio, both clutch 86 and clutch 88 are engaged, and intermediate clutch 90 is engaged. This action drives sun gear 56 through clutch 88 at a speed reduction produced by gearset 30, and sun gear 46 and carrier 60 are overdriven through clutch 88 from the input shaft 26. The output is taken on carrier 50 and output shaft 64.

To produce reverse drive, sun gear 56 of the second planetary gear unit is underdriven through gearset 30 and clutch 86, and carrier 60 of gear unit 54 is held against rotation on the transmission casing during drive and coast conditions by brake 82'. The output of gear unit 54 is taken at ring gear 58, carrier 50 and output shaft 64. Engine braking is available in the reverse drive condition; brake 82 holds carrier 60 fixed against rotation and provides the gearset reaction.

FIG. 5 shows a schematic diagram similar to that of FIG. 3 except that the gearset 36 has its pinion 38 fixed to input shaft 26 and its gear 40 clutched through overdrive clutch 76 to ring gear 46 and carrier 60. Gearset 30 has its pinion 28 journalled on input shaft 26 and located such that it is releasably connected to shaft 26 through underdrive clutch 32. Low-reverse brake 82 is located adjacent overrunning coupling 84, but this arrangement is located at the opposite end of the gear arrangement from the location of torque converter 14 due to the reversed disposition of planetary gearsets 44 and 54 compared to the arrangement of FIG. 5, the first gearset 44 being located closer to the torque converter than the second planetary gearset 54. The interconnection among the elements of the planetary gear units, gearsets 30, 36, the input shaft, and output shaft are essentially identical to those of FIG. 3.

The above description of the operation of the arrangement of FIG. 3 with reference to the schedule of FIG. 4 applies also to the arrangement of FIG. 5.

Figures 6, 7:
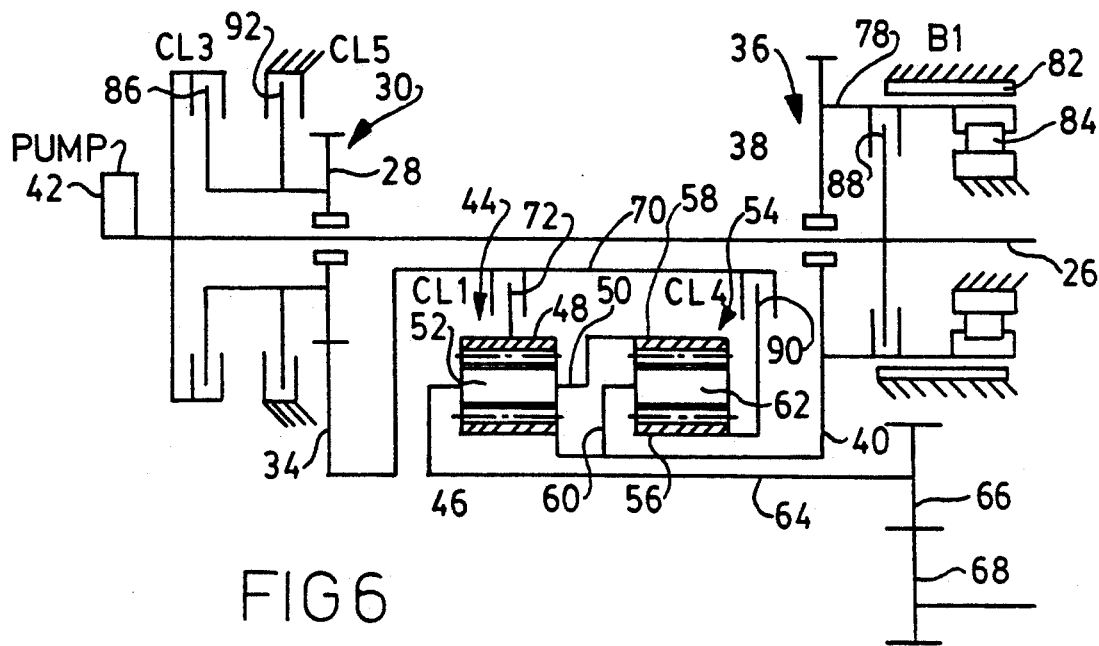
FIG. 6 is a schematic diagram of a gear and clutch arrangement for an automatic transmission according to this invention adapted to produce six forward gear ratios.
FIG. 7 is a schedule showing the state of the brakes, clutches and coupling of FIG. 6

FIG. 6 shows a schematic diagram similar to that of FIG. 3 but including high brake 92, which releasably connects, through gearset 30 and intermediate clutch 90, sun gear 56 of the second planetary gear unit 54 and transmission casing 80. All of the other components of the transmission of FIG. 7 are arranged, interconnected and function the same as the corresponding components of the transmission shown in FIG. 3 during operation in the 1M range, reverse range and throughout the five lowest gear ratios of the D or OD range.

The schedule of FIG. 7 shows that a sixth forward gear ratio results by engaging overdrive clutch 88, intermediate clutch 90 and high brake 92. This action causes coupling 84 to overrun in drive and coast conditions. Input shaft 26 drives carrier 60 of the second planetary gear unit 54 through clutch 88. Sun gear 56 is fixed against rotation on the transmission casing through the drive connection that includes intermediate clutch 90, drum 70, gearset 30 and high brake 92. The output is taken at ring gear 58, carrier 50 and output shaft 64.

Figures 8, 9:
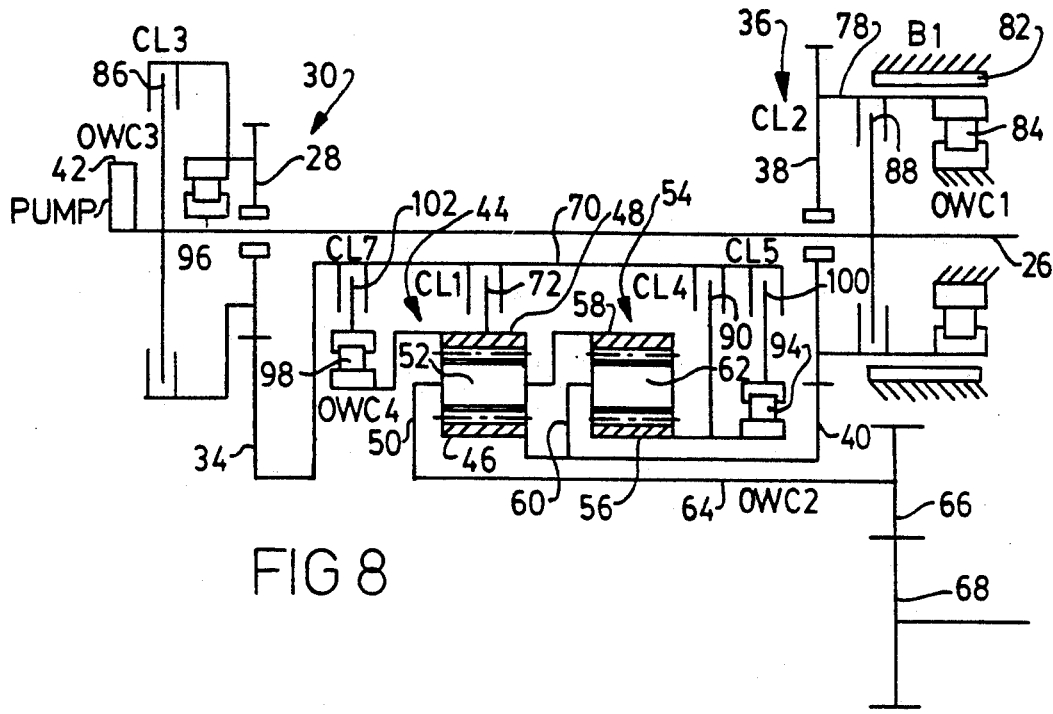
FIG. 8 is a schematic diagram showing the clutch and gear arrangement of a fully nonsynchronous transmission according to the invention.
FIG. 9 is a schedule showing the state of the brakes, clutches and couplings shown schematically in the diagram of FIG. 9.

A nonsynchronous five-speed version of the transmission of FIG. 3 is illustrated in FIG. 8. The corresponding schedule of the engaged and disengaged state of the friction elements and the driving and overrunning state of the one-way couplings is set forth in FIG. 9. Three additional one-way couplings are employed in the arrangement of FIG. 8, and two additional friction elements are set forth in that figure.

Located in parallel relationship with clutch 90 between drum 70 and sun gear 56 are an overrunning coupling 94 and intermediate clutch 100, the coupling and clutch being arranged mutually in series. Located adjacent coast clutch 72 between drum 70 and ring gear 48 is a series arrangement that includes forward clutch 102 and overrunning coupling 98, the series arrangement being disposed in parallel with coast clutch 72. Located in parallel with high clutch 86 between input shaft 26 and pinion 28 of gearset 30 is an overrunning coupling 96. Couplings 94, 96, 98 produce a one-way drive connection between their inner and outer races. For example, coupling 96 produces a one-way drive connection between shaft 26, which is driveably connected to the inner race of the coupling, and pinion 28, which is driveably connected to the outer race of the coupling.

Referring now to the schedule of FIG. 9, with the gear selector in the D range, the first speed ratio results by driving ring gear 48 of the first planetary gear unit from input shaft 26, through coupling 96, gearset 30, clutch 102 and coupling 98. Sun gear 46 and gearset 36 are held against rotation through operation of coupling 84. The output is taken at carrier 50 and output shaft 64. There is no engine braking during coast conditions. When the gear selector is moved to the 1M range, the first gear ratio results using the same torque delivery paths as in the D range, except that engine braking is available in the coast condition because brake 82 holds ring gear 46 against rotation, although coupling 84 overruns. Engagement of clutch 86 prevents coupling 96 from overrunning during coast conditions.

In the D range, second speed ratio is produced by driveably connecting input shaft 26 to ring gear 56 of the second planetary gear unit through coupling 96, gearset 30, drum 70, clutch 100 and coupling 94. Recognizing that ring gear 46 is driveably connected to carrier 60, the output is taken at ring gear 58, carrier 50 and output shaft 64. There is no engine braking available during a coast condition; couplings 92, 94 and 96 overrun.

When the gear shift lever is moved to the 2M range, the second speed ratio results. Torque is delivered from the input shaft to sun gear 56 through the same torque delivery paths as described above for operation in the D range. However, due to engagement of clutch 90, during coast conditions, engine braking is available.

In the D range, the third gear ratio is produced by driving ring gear 48 of planetary gear unit 44 from input shaft 26 through coupling 96, gearset 30, clutch 102 and coupling 98. Sun gear 46 is overdriven with respect to input shaft 26 through clutch 88 and gearset 36. The output is taken at carrier 50 and output shaft 64. Engine braking is not available; all of the couplings overrun or are inactive during coast conditions.

When the gear shift lever is moved to the 3M range, the third gear ratio is produced substantially as described above for operation in the D-range, except that during coast conditions engine braking is available because clutch 72 provides a parallel torque delivery path between drum 70 and ring gear 48, although coupling 98 overruns during coast conditions.

When the gear selected is moved to the D range, the fourth speed ratio results by overdriving carrier 60 of the second planetary gear unit 54 with respect to input shaft 26, through clutch 88 and gearset 36. Sun gear 56 is driveably connected to ring gear 48 through clutch 90, drum 70, and the parallel torque delivery paths that include clutch 102 and coupling 98. The output is taken at ring gear 58, carrier 50 and output shaft 64.

When the gear selector is moved to the 4M position, the torque delivery paths that produce the fourth speed ratio are substantially as described with respect to operation in the D range except that engine braking is available during coast conditions because engagement of clutch 72 maintains a connection between ring gear 48 and sun gear 56, although coupling 98 overruns.

To produce the fifth gear ratio, sun gear 56 is underdriven by the input shaft through the torque delivery path that includes clutch 86, gearset 30, drum 70 and clutch 90. Carrier 60 is overdriven with respect to input shaft 26 through clutch 88 and gearset 36. The output is taken at ring gear 58, carrier 50 and output shaft 64. Engine braking is available during coast conditions.

To produce reverse drive, sun gear 56 of the second planetary gear unit 54 is underdriven with respect to input shaft 26 through operation of clutch 86, drum 70 and clutch 90. Carrier 60 is held against rotation on the transmission casing by brake 82. Ring gear 58 drives carrier 50 and output shaft 64. The gearset reaction is continually available.

We claim:

1. A multiple speed ratio automatic transmission, comprising:
   an input shaft (26);
   an output shaft (64);
   a first gearset (36);
   a second gearset (30);
   first and second gear units, each gear unit having a sun gear, ring gear, planet pinions meshing with the sun gear and ring gear, and carrier rotatably supporting the planet pinions;
   the sun gear (46) of the first gear unit, carrier (60) of the second gear unit, and first gearset mutually driveably connected;
   the carrier (50) of the first gear unit, ring gear (58) of the second gear unit, and output shaft mutually driveably connected;
   first brake means (82, 84) for releasably holding the sun gear of the first gear unit, carrier of the second gear unit, and first gearset against rotation;
   first clutch means (76) for releasably connecting mutually the sun gear of the first gear unit, carrier of the second gear unit, first gearset and the output shaft;
   second clutch means (32) for releasably connecting the input shaft and first gearset;
   third clutch means (72) for releasably connecting the ring gear (48) of the first gear unit to the second gearset; and
   fourth clutch means (74) for releasably connecting the sun gear (56) of the second gear unit to the second gearset.

2. The transmission of claim 1 wherein the first brake means comprises:
   first coupling means (84) for producing a one-way drive connection of the sun gear of the first gear unit, carrier of the second gear unit, and first gearset to a nonrotatable surface; and
   friction brake means (82) for releasably holding said sun gear of the first gear unit, carrier of the second gear unit, and first gearset against rotation.

3. The transmission of claim 1 further comprising torque converter means driveably connected to the input shaft and adapted for connection to a power source for producing an hydrokinetic connection between the input shaft and power source.

4. The transmission of claim 1 wherein the first gearset includes:
   a first pinion connected to the input shaft; and
   a first gear in meshing engagement with said first pinion, driveably connected to the sun gear of the first gear unit and carrier of the second gear unit.

5. The transmission of claim 1 wherein the second gearset includes:
   a second pinion releasably connected to the input shaft; and
   a second gear in meshing engagement with said second pinion, driveably connected to the first brake means, first clutch means, carrier of the second gear unit and sun gear of the first gear unit.

6. The transmission of claim 1 wherein:
   the first gearset overdrives the sun gear of the first gear unit and carrier of the second gear unit in relation to the speed of the input shaft; and
   the second gearset underdrives the sun of the second gear unit and ring gear of the first gear unit in relation to the speed of the input shaft.

7. A multiple speed ratio automatic transmission, comprising:
   an input shaft (26);
   an output shaft (64);
   a first and second gearset means for producing a speed change between the input shaft and an element of each gearset means;
   first and second gear units, each gear unit having a sun gear, ring gear, planet pinions meshing with the sun gear and ring gear, and carrier rotatably supporting the planet pinions;
   the sun gear (46) of the first gear unit, carrier (60) of the second gear unit, and first gearset mutually driveably connected;
   the carrier (50) of the first gear unit, ring gear (58) of the second gear unit, and output shaft mutually driveably connected;
   first brake means (82, 84) for releasably holding a first element of the first gear unit against rotation;
   first clutch means (76) for releasably connecting mutually said first element of the first gear unit and input shaft;
   second clutch means (32) for releasably connecting the input shaft and one of said first and second gearset means;
   third clutch means (72) for releasably connecting a second element of the first gear unit to one of said first and second gearset means; and
   fourth clutch means (74) for releasably connecting an element of the second gear unit to one of said first and second gearset means.

8. The transmission of claim 7 wherein the first brake means comprises:
   first coupling means (84) for producing a one-way drive connection of the sun gear of the first gear unit, carrier of the second gear unit, and first gearset to a nonrotatable surface; and
   friction brake means (82) for releasably holding said sun gear of the first gear unit, carrier of the second gear unit, and first gearset against rotation.

9. The transmission of claim 7 further comprising torque converter means driveably connected to the input shaft and adapted for connection to a power source for producing an hydrokinetic connection between the input shaft and power source.

10. The transmission of claim 7 wherein the first gearset means includes:
    a first pinion driveably connected to the input shaft; and
    a first gear in meshing engagement with said first pinion, driveably connected to the sun gear of the first gear unit and carrier of the second gear unit.

11. The transmission of claim 7 wherein the second gearset means includes:
    a second pinion releasably driveably connected to the input shaft; and
    a second gear in meshing engagement with said second pinion, driveably connected to the first brake means, first clutch means, carrier of the second gear unit and sun gear of the first gear unit.

12. The transmission of claim 7 wherein:
    the first gearset means overdrives the sun gear of the first gear unit and carrier of the second gear unit in relation to the speed of the input shaft; and
    the second gearset means underdrives the sun of the second gear unit and ring gear of the first gear unit in relation to the speed of the input shaft.

13. A multiple speed ratio automatic transmission, comprising:
    an input shaft;
    an output shaft;
    first and second gear units, each gear unit having a sun gear, ring gear, planet pinions meshing with the sun gear and ring gear, and carrier rotatably supporting the planet pinions;
    a first gearset including a first pinion connected to the input shaft and a first gear in meshing engagement with said first pinion, driveably connected to the sun gear of the first gear unit and carrier of the second gear unit;
    a second gearset including a second pinion releasably connected to the input shaft and a second gear in meshing engagement with said second pinion, driveably connected to a first brake means, a first clutch means, said carrier of the second gear unit and said sun gear of the first gear unit;
    the sun gear of the first gear unit, carrier of the second gear unit, and first gearset mutually driveably connected;
    the carrier of the first gear unit, ring gear of the second gear unit, and output shaft mutually driveably connected;
    first brake means for releasably holding the sun gear of the first gear unit, carrier of the second gear unit, and second gearset against rotation, comprising
    first coupling means for producing a one-way drive connection of the sun gear of the first gear unit, carrier of the second gear unit, and first gearset to a nonrotatable surface; and friction brake means for releasably holding said sun gear of the first gear unit, carrier of the second gear unit, and first gearset against rotation;

first clutch means for releasably connecting mutually the sun gear of the first gear unit, carrier of the second gear unit, first gearset and the output shaft;

second clutch means for releasably connecting the input shaft and first gearset;

third clutch means for releasably connecting the ring gear of the first gear unit to the second gearset; and fourth clutch means for releasably connecting the sun gear of the second gear unit to the second gearset.

14. The transmission of claim 13 wherein:

the first gearset overdrives the sun gear of the first gear unit and carrier of the second gear unit in relation to the speed of the input shaft; and the second gearset underdrives the sun of the second gear unit and ring gear of the first gear unit in relation to the speed of the input shaft.

* * * * *